W. E. KING.
PNEUMATIC TIRE.
APPLICATION FILED FEB. 25, 1915.
1,214,321.
Patented Jan. 30, 1917.
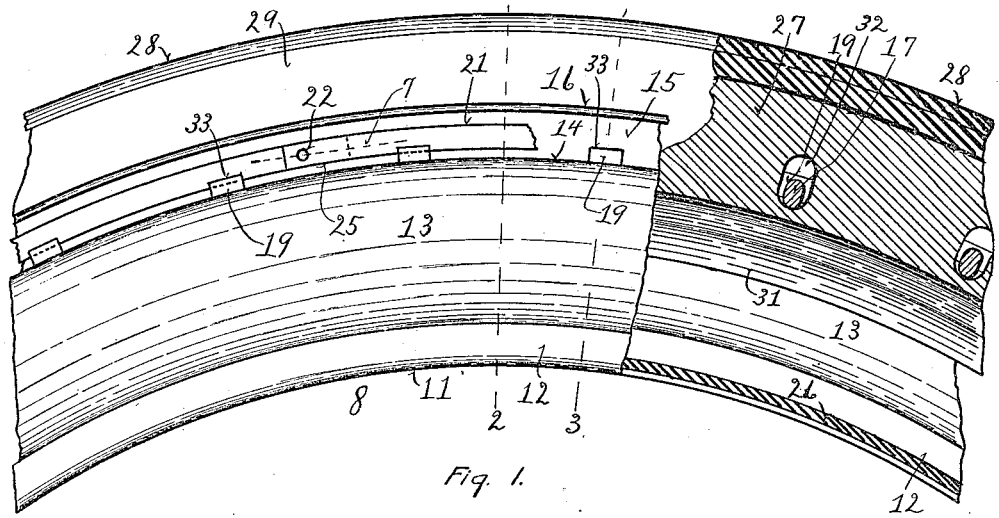
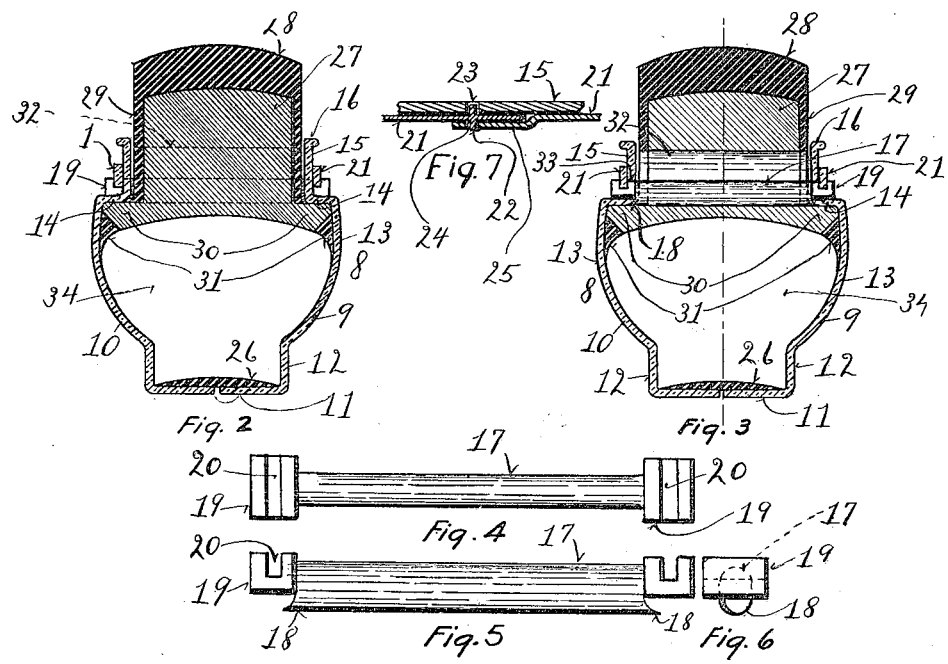
Witnesses.
C. J. Rosen
J. M. Stark
Willard E. King, Inventor.
By his Attorney,
J. A. Rosen United States Patent Office.

WILLARD E. KING, OF TOPEKA, KANSAS.

PNEUMATIC TIRE.

1,214,321.   Specification of Letters Patent.   Patented Jan. 30, 1917.

Application filed February 25, 1915. Serial No. 10,573.

*To all whom it may concern:*

Be it known that I, WILLARD E. KING, a citizen of the United States, residing at Topeka, in the county of Shawnee and State of Kansas, have invented certain new and useful Improvements in Pneumatic Tires, of which the following is a specification.

My invention has for its object a stronger and more durable pneumatic tire for automobiles and other vehicles than has heretofore been produced; one that is substantially puncture proof, that has rigid side walls and a suitable flexible and resilient tread member so that substantially all of the resiliency of the compressed air in the air chamber is utilized in the radial movement of the tread member, that has a tread member which is separable and renewable, and that improves the traction by eliminating substantially all of the "drag" incident to the ordinary pneumatic tire.

A further object is to provide such a tire with a base portion adapted to be easily and quickly fitted to the ordinary rim of an automobile wheel, so that it may be used for replacing ordinary pneumatic tires, without the necessity of providing a new wheel or changing the rim.

A further object is to provide a special means of connecting the flexible tread to the rigid side walls, so as to provide for proper articulation between the tread and the side walls, without injury to any portion.

My invention is a pneumatic tire comprising rigid base and side walls, as of metal, and a yielding or resilient tread member, as of fabric and rubber, the tread member being secured to the side walls by shouldered formations and the lines of juncture being sealed by means of soft rubber fillets.

It further comprises these parts assembled as hereinafter pointed out; and it further comprises the parts, improvements, and combinations hereinafter set forth and claimed.

In the drawings accompanying and forming part of this specification and in the description of the drawings, I have shown my invention in its preferred form and what I deem to be the best mode of applying the principles thereof; but it is to be understood that, within the scope of the appended claims, I contemplate changes in form, proportions, and materials, the transposition of parts, and the substitution of equivalent members, without departing from the spirit of my invention.

Figure 1 is a side elevation of a segment of my improved pneumatic tire, part being shown in center section. Figs. 2 and 3 are transverse sections on planes indicated by the lines 2 and 3, respectively, in Fig. 1. Figs. 4, 5, and 6 are, respectively, top, side, and end views of one of the bridge-bolts, enlarged. Fig. 7 is a sectional view, on a plane indicated by the line 7 in Fig. 1.

Similar reference characters indicate like or corresponding parts throughout the several views.

The base and side walls are made of suitable strong rigid material, as steel, with a peripheral opening for the reception of a suitable flexible and resilient tread member, as of fabric with a rubber covering. Preferably to facilitate manufacture and assembly and for other reasons which will be hereinafter explained, the base and side walls comprise two similar parts 9 and 10, each constituting one-half, the division being along the longitudinal middle of the base; but for convenience of description they will be considered as an entirety.

11 is the base from which rise the side walls 12, 12, these parts being adapted to be seated upon the ordinary automobile wheel rim between the flanges thereof. Thence the side walls are curved outwardly and upwardly (viewed in transverse section), as indicated at 13, 13, and then are turned inwardly (*i. e.*, toward each other) forming the shoulders 14, 14. Thence the side walls extend upwardly forming the flanges 15, 15, whose peripheries are formed into the laterally projecting reinforcing beads 16, 16. An annular opening is thus left between the opposite side walls, shoulders, and flanges for the reception of the tread member.

It will be noted that the form of the base and immediately adjacent portions of the side walls is such that the tire is adapted to be seated on the automobile wheel rim ordinarily provided for pneumatic tires; that is, it is seated on the rim between the flanges thereof; and it may be quickly applied to and removed from the ordinary commercial rim of the Q. D. type in the same manner as in manipulating an ordinary pneumatic tire. And although the bridge-bolts maintain the side walls in substantially rigid relation to each other, still the construction is such that a slight motion exists, and this is sufficient to adapt the tire to the slight variations existing in the widths between the flanges of rims that are intended to be the same, when the tire is properly inflated.

Spanning the annular opening are a number of bridge-bolts placed rather closely together. The bridge-bolt which I prefer to use is approximately oval in cross section, as shown at 17, is formed with a shoulder 18 at each end and also with an angular head 19 at each end, the head being formed with a slot 20. Each flange is formed with angular holes 33 into which the bridge-bolt heads closely fit, with the shoulders 18, 18 bearing against the flanges and the inner edge of each slot in line with the outer edge of the flange through which the bolt-head is extended. A retaining ring 21 extending around the tire fits into the slots and bears against the side of the flange, to lock the bolts firmly in their positions. There is such a retaining ring on each side of the tire. The bridge-bolts are thus firmly held in place by reason of the grip of each flange between the shoulder 18 and the retaining or locking ring 21. The rings are properly formed to fit closely in place, and each is split, for convenience of applying and removing, one end having a pin 22 projecting from both sides, one end of the pin fitting into a hole 23 in the flange 15 and the other end fitting in the hole 24 of the overlapping portion 25 of the other end of the ring. These ends and pin may be easily sprung into and out of position in applying and removing the ring; but are not apt to become displaced accidentally in the ordinary use of the tire.

26 is a soft rubber inner collar fitting over the base within the tire. Its function is to seal the joint between the two sections of the tire, and it is to be fitted with the valve stem and valve adapted to extend through the rim and felly in the ordinary manner. Within a limited range this line of junction of the two parts may be considered as an expansion joint, permitting the side walls 12, 12 to be forced against the rim-flanges under the influence of the air pressure, and the collar 26 maintaining a perfectly airtight seal. The latitude for expansion of the joint makes it possible to fit the tire firmly into the rim when the tire is inflated.

The tread member is made up of a fabric core 27 covered with a rather thick peripheral rubber covering 28 and sides 29, 29. It is formed with shoulders 30, 30 at its base, which bear upwardly against the shoulders 14, 14 of the side walls, and with soft rubber tips or fillets 31 which bear against the side walls to form a perfect seal. As these tips or fillets are of soft rubber, the air pressure forces them firmly against the side walls, and it is impossible for them to slip or to be pushed inwardly along said side walls; and this inward movement is further guarded against by the curved contour of the side walls. The shoulder portions, being of fabric, are to some degree flexible, and under the influence of the inwardly pushed tread portion proper, as under the stress of the load, they bend inwardly with the base of the tread, and this extreme movement will reverse the arc shown in the drawings. However, it will be clear that the heavier the load the greater the pressure will be within the tire and the firmer the soft rubber fillets will be forced against the side walls, so that it is practically impossible to dislodge the soft rubber fillets; and by reason of this and the action of the shoulder portions, there is a hinged relation between the soft rubber fillets and the shoulder portions. This permits the free action and bending of the shoulder portions under stress of the load, without disturbing the seal, and without frictional or sliding movement between the rubber and the metal. The tread member is also formed with a number of transverse holes 32, one for each bridge-bolt. These holes are substantially of the same form in cross section as are the bridge-bolts, but are larger, and they are so disposed that when the air is under maximum compression the bridge-bolt just about contacts with the side of the hole nearest the center of the wheel. It will also be noted that the longer diameters of both bridge-bolts and holes extend radially of the wheel. The bolt-heads are of such size that they may be pushed through the holes 32 in assembling and dismantling. The purpose of making the holes 32 larger than the bridge-bolts and arranging them relatively as described, is to give the tread a wide range of radial movement under the influence of a pressure against the outside toward the middle of the wheel, such as is exerted by the load. The bridge bolts and the openings through which they extend are preferably so related as to limit positively the inward radial movement of the tread portion proper before such inward movement can upset the rubber tips or fillets.

It will be noted that with my rigid side walls, none of the air pressure is utilized to sustain them as in the case of the ordinary pneumatic tire. The side-walls are self-sustaining independently of the air pressure; they do not yield to pressure from the outside against the tread as by the load. Hence the tendency to flatten against the ground transversely is eliminated, except to the extent that there is resiliency inherent in the tread member itself. This function in the ordinary pneumatic tire also permits a greater peripheral length of the tread surface to come into contact with the ground, and thus brings a comparatively large area of the tread surface into contact with the ground, and creates a "drag" by reason of which much of a tractive force is lost. With my tire, on the other hand, since the transverse flattening is eliminated (except for the resiliency inherent in the tread member itself), the pressure against the outside is met by the undiminished (rather, increased) air pressure within; and since the side walls cannot yield, the whole beneficial effect of the air pressure is exerted radially against the tread member. For these reasons my tread can be kept more nearly to the perfect round peripherally, thus eliminating much of the large tread area which with ordinary pneumatic tires contacts with the ground, eliminating much of the "drag" caused thereby, and the consequent loss of power absorbed thereby. Further, not all the pressure from the outside is met by the air pressure. It is met in part by the resiliency inherent in the tread member itself. Also it is met by the compression of the tread member against the bridge-bolts; for example, if pressure is applied against the outside of the tread between two bridge-bolts, the tread will be compressed not only inwardly but also longitudinally against those bridge-bolts, and if applied directly over one of the bridge-bolts, then also against the two adjacent bridge-bolts; but, by reason of the relative sizes of the bridge-bolts and holes as hereinbefore explained, the tread member will have considerable movement inwardly before encountering the solid resistance of the bridge-bolts.

The comparatively deep or thick tread member is substantially puncture proof.

The steel casing, the bridge-bolts, and the retaining or locking rings, being of steel, are practically indestructible. The tread, though obviously more durable than the tread of the ordinary pneumatic tire, is, compared to the steel parts, short-lived. But it will be understood from the foregoing description that the tread, when it becomes worn out, may be removed and replaced by a new tread member, or it may be repaired or rebuilt, or usable parts otherwise again utilized.

My improved tire is adapted especially for higher pressure than is ordinarily used within pneumatic tires, and is also especially adapted for heavy duty. By using the higher pressure, there is less injury to the tire from internal friction; and it will be especially noted that the tire is so constructed as to withstand very high internal pressure.

I am aware that the prior art includes pneumatic tires with rigid bases and side walls and flexible tread members with various devices for taking care of the movement of the tread member. Also I am aware of such tires with fillets for seals, in which the tread portions and fillets have a plunger-like action with relation to the side walls, the fillets having a sliding movement against the side walls, and I expressly disclaim such, as my fillets are in the main stationary in their seat against the side walls under the air pressure, except for their elasticity and stretching in serving as part of the hinge for permitting the inward radial movement of the tread portion proper and the consequent in-bending of the shoulder portions.

Having thus described my invention what I claim as new and desire to secure by Letters Patent is:

1. In pneumatic tires, the combination of rigid base and side walls, a flexible tread member, said parts forming an annular air chamber, bridge bolts spanning said side walls and the tread member being formed with transverse openings for the accommodation of said bridge bolts, said openings being larger in cross section than the bridge bolts to permit radial and longitudinal action of each portion of the tread; said side walls and tread member being formed with co-acting shoulders to limit the outward radial movement of the tread member; and said tread member being also formed with soft rubber annular inwardly extending flanges bearing against the respective side walls and with a transversely flexible element between the soft rubber flanges and the tread portion which permits the inward radial action of the tread under stress of the load and against the air pressure within the tire, without dislodging the soft rubber flanges from their seats.

2. In pneumatic tires, the combination of a rigid base and side walls, said side walls being formed with inwardly facing annular shoulders, and a flexible tread member fitted between the side walls and spaced apart from the base and formed with transversely flexible laterally extending annular shoulders bearing against the respective side wall shoulders and formed also with soft rubber annular inwardly extending flanges along the edges of the respective tread-member shoulders and bearing against the respective side walls; said tire base, side walls, and tread member forming an annular air chamber, and said soft rubber flanges forming under air pressure within said chamber an air tight seal between the tread member and the side walls and forming elastic and flexible connections between the side walls and the respective shoulder portions of the tread member.

3. In pneumatic tires, the combination of a steel channel forming the base and side walls of a pneumatic tire, said side walls being formed with inwardly facing annular shoulders opposite each other along their periphery, bridge bolts spanning said side walls, and a flexible tread member formed with transversely flexible laterally extending outwardly facing shoulder portions bearing against the respective side wall shoulders, said steel channel and said tread member forming an annular air chamber, and said tread shoulders being formed with soft rubber fillets bearing against the respectively adjacent side walls, the transverse flexing of the tread shoulders permitting inward radial movement of the tread without dislodging said fillets, and said fillets forming an air tight elastic and flexible connection between the side walls and the tread shoulders.

4. The combination of a steel channel forming the base and side walls of a pneumatic tire, said side walls being formed with inwardly facing annular shoulders, and a flexible tread member formed with transversely flexible laterally extending outwardly facing annular shoulder portions bearing against the respective side wall shoulders, said steel channel and said tread member forming an annular air chamber, and said tread shoulders being also formed with inwardly extending annular soft rubber fillets bearing against the respectively adjacent side walls, the transverse flexing of the tread shoulders permitting inward radial movement of the tread portion and said fillets forming air tight and elastic and flexible connections between the tread shoulders and the respective side walls.

5. The combination of a steel channel forming the base and side walls of a pneumatic tire, a flexible tread member, said channel and tread member forming an annular air chamber, means for limiting the radially outward action of the tread member, soft rubber annular fillets bearing against the respective side walls, and an annular transversely flexible element connecting the tread with the respective fillets inside limiting means, the flexing of said flexible element permitting inward radial movement of the tread and said fillets forming air tight elastic and flexible annular connections between said flexible element and the respective side walls.

6. In pneumatic tires adapted for use in conjunction with quick-detachable and equivalent types of rims, the combination of a two-piece steel channel having a base formed to fit on said rim between the flanges thereof and having its division line along the middle of the base, a collar fitted over said line of division to form an air-tight seal therefor, a flexible tread member mounted in said channel between the side walls, and a series of bridge bolts spanning the side walls; said channel and tread forming an annular air chamber.

In testimony whereof I have affixed my signature in presence of two witnesses.

WILLARD E. KING.

Witnesses:
 C. J. ROSEN,
 J. M. STARK.

Copies of this patent may be obtained for five cents each, by addressing the "Commissioner of Patents, Washington, D. C."